United States Patent
Hashim et al.

(10) Patent No.: US 10,164,273 B2
(45) Date of Patent: Dec. 25, 2018

(54) APPARATUS AND METHOD FOR HEATING A FUEL CELL STACK

(71) Applicant: Ford Global Technologies, LLC, Dearborn, MI (US)

(72) Inventors: Hasdi R. Hashim, Ann Arbor, MI (US); Craig Winfield Peterson, West Bloomfield, MI (US); Raymond Anthony Spiteri, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1070 days.

(21) Appl. No.: 13/959,242

(22) Filed: Aug. 5, 2013

(65) Prior Publication Data

US 2014/0272649 A1    Sep. 18, 2014

Related U.S. Application Data

(60) Provisional application No. 61/794,728, filed on Mar. 15, 2013.

(51) Int. Cl.
*H01M 8/04701* (2016.01)
*H01M 8/04223* (2016.01)

(52) U.S. Cl.
CPC ... *H01M 8/04731* (2013.01); *H01M 8/04268* (2013.01); *H01M 2250/20* (2013.01); *Y02T 90/32* (2013.01)

(58) Field of Classification Search
CPC .............. H01M 8/04731; H01M 8/04268
See application file for complete search history.

(56) References Cited

U.S. PATENT DOCUMENTS

| 6,358,638 | B1 | 3/2002 | Rock et al. |
| 7,968,240 | B2 | 6/2011 | Hochgraf et al. |
| 2006/0152085 | A1 | 7/2006 | Flett et al. |

(Continued)

FOREIGN PATENT DOCUMENTS

WO    2009126692 A1    10/2009

OTHER PUBLICATIONS

Anzicek et al., "Power Converter and Control Interface for a Gem Fuel Cell Vehicle", Proceedings of FUELCELL2005, 2005, pp. 329-333.

(Continued)

*Primary Examiner* — Helen Oi K Conley
(74) *Attorney, Agent, or Firm* — Brooks Kushman P.C.

(57) ABSTRACT

An apparatus for heating a fuel cell stack in a cold start mode is provided. The apparatus comprises a fuel cell stack, a boost converter, and a controller. The fuel cell stack powers a vehicle. The boost converter includes a power switch that is thermally coupled to the fuel cell stack. The controller is configured to receive a signal indicative of a temperature during a vehicle startup and to compare the temperature to a predetermined temperature value. The controller is further configured to activate the power switch if the temperature is below the predetermined temperature value such that the power switch generates heat to apply to the fuel cell stack and generates a voltage for powering a power circuit to enable the vehicle to driveaway while the fuel cell stack receives the heat.

15 Claims, 2 Drawing Sheets

(56) References Cited

U.S. PATENT DOCUMENTS

2006/0280977 A1* 12/2006 Sakajo ............... B60L 11/1885
429/429
2007/0292724 A1   12/2007 Gilchrist

OTHER PUBLICATIONS

Chinese Office Action and English translation for Application No. 201410099489, dated Apr. 25, 2017, 10 pages.
Chinese Office Action for Application No. 201510340587.5, dated Sep. 6, 2018, 6 pages.

* cited by examiner

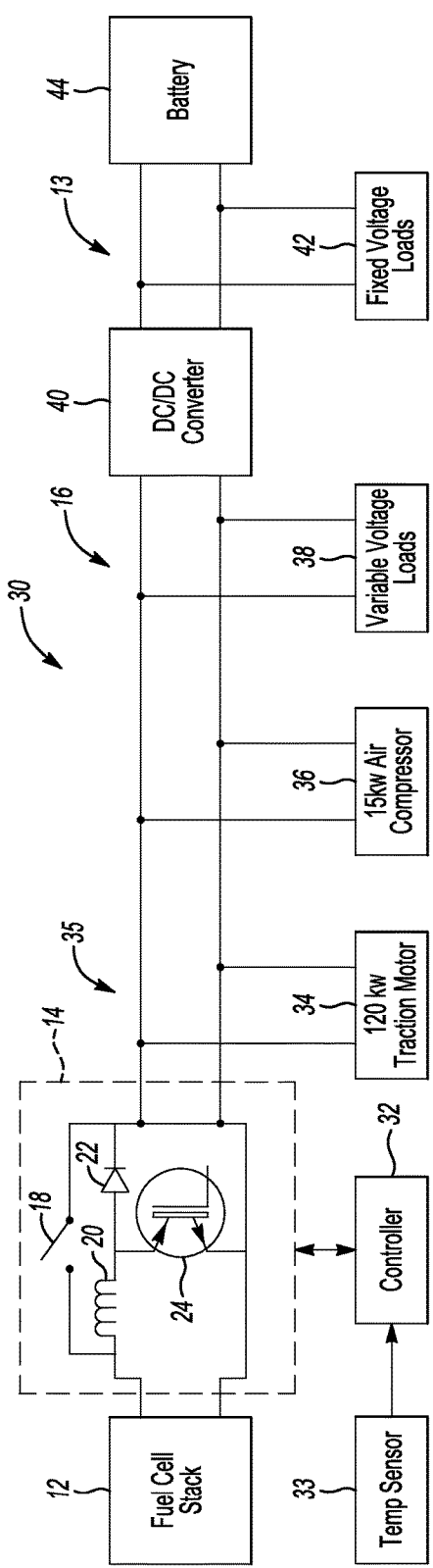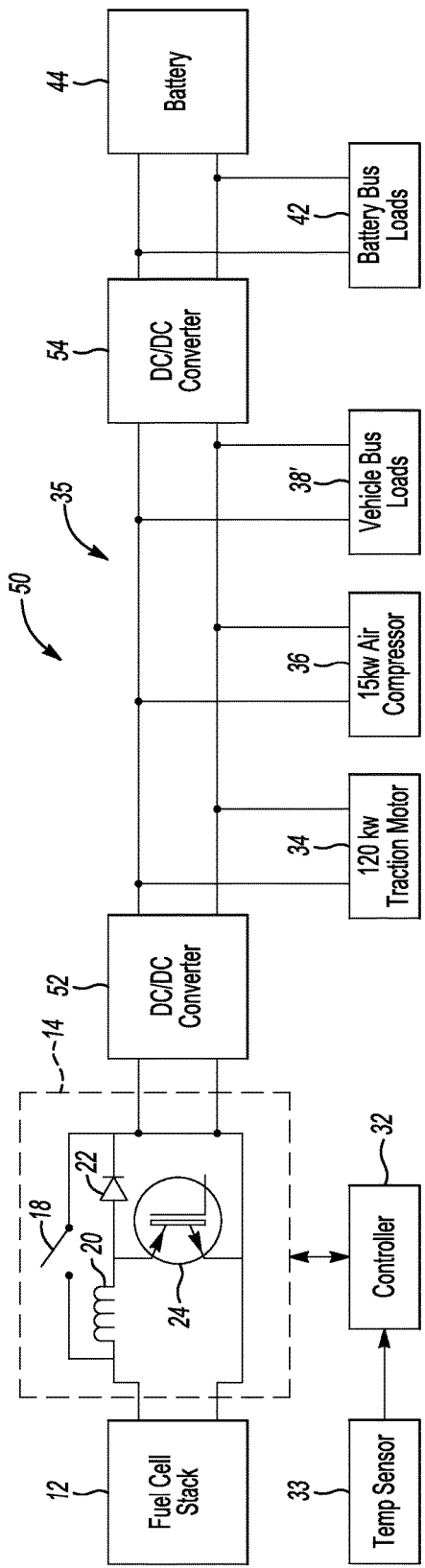

US 10,164,273 B2

APPARATUS AND METHOD FOR HEATING A FUEL CELL STACK

CROSS-REFERENCE TO RELATED APPLICATIONS

This application claims the benefit of U.S. provisional application Ser. No. 61/794,728 filed Mar. 15, 2013 which is incorporated herein by reference in its entirety.

TECHNICAL FIELD

Embodiments disclosed herein generally relate to an apparatus and method for heating a fuel cell stack.

BACKGROUND

A fuel cell stack implementation is disclosed in U.S. Publication No. 2007/0292724 ("the '724 publication") to Gilchrist. The '724 publication discloses a power supply system that is operable during a cold-start condition. The power supply system comprises a fuel cell stack that is electrically operable to produce direct current (DC) power and a power conversion system that is electrically coupled to the fuel cell stack and operable to receive DC power from the fuel cell stack. The power supply system further comprises at least one battery electrically coupled to the power conversion system and operable to exchange battery DC power with the power conversion system and a controller that is at least operable to control operation of the power supply system such that at least an amount of pulsating current is supplied to the battery during the cold-start condition.

SUMMARY

An apparatus for heating a fuel cell stack in a cold start mode is provided. The apparatus comprises a fuel cell stack, a boost converter, and a controller. The fuel cell stack powers a vehicle. The boost converter includes a power switch that is thermally coupled to the fuel cell stack. The controller is configured to receive a signal indicative of a temperature during a vehicle startup and to compare the temperature to a predetermined temperature value. The controller is further configured to activate the power switch if the temperature is below the predetermined temperature value such that the power switch generates heat to apply to the fuel cell stack and generates a voltage for powering a power circuit to enable the vehicle to driveaway while the fuel cell stack receives the heat.

An apparatus for heating a fuel cell stack in a cold start mode is provided. The apparatus comprises a controller that is operably coupled to a boost converter that includes a power switch. The power switch is thermally coupled to a fuel cell stack. The controller is configured to receive a signal indicative of a temperature during a vehicle startup and to compare the temperature to a predetermined temperature value. The controller is further configured to activate the power switch if the temperature is below the predetermined temperature value such that the power switch generates heat to apply to the fuel cell stack and generates a voltage for powering a power circuit to enable the vehicle to driveaway while the fuel cell stack receives the heat.

An apparatus comprising a controller is provided. The controller is operably coupled to a boost converter that includes a power switch. The controller is configured to receive a signal indicative of a temperature during vehicle startup and to activate the power switch if the temperature is below a predetermined temperature value to apply heat to a fuel cell stack and to generate a voltage for powering a power circuit to enable vehicle driveaway while heating the fuel cell stack.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 2 depicts a second apparatus for heating the fuel cell stack in a high voltage implementation in accordance to one embodiment;

FIG. 3 depicts a third apparatus for heating the fuel cell stack in a low voltage implementation in accordance to one embodiment.

DETAILED DESCRIPTION

Figure 1:
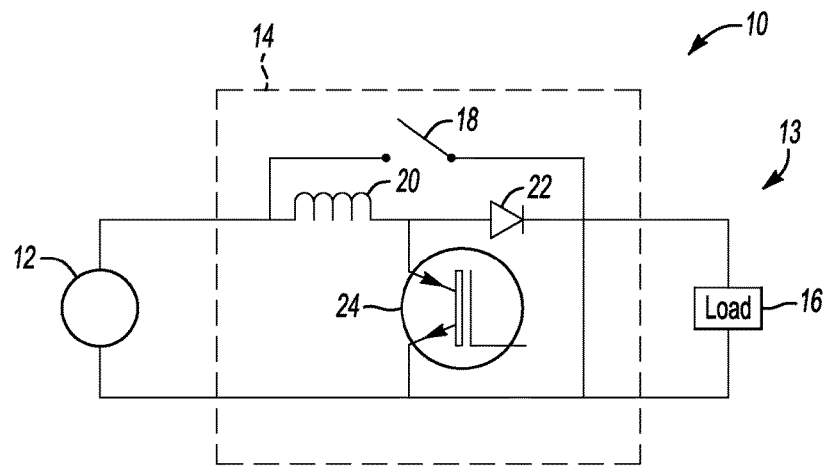
FIG. 1 depicts a first apparatus for heating a fuel cell stack in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

A fuel cell stack generates electrical power in response to electrochemically converting oxygen and hydrogen. In general, the fuel cell stack includes a plurality of fuel cells that are joined together in which each fuel cell generates a portion of the total amount of electrical current provided by the fuel cell stack. In general, cold starting of the fuel cell stack may require dumping power externally, such as dumping it into a water ethylene glycol (WEG) heater or using a traction motor (or electric powertrain system) in a power waste mode. The WEG heater is used to heat the fuel cell stack during in a cold start mode. In some implementations, at least two WEG heaters may be used for enabling the cold start of the fuel cell stack. This condition adds weight to a vehicle for something that may be rarely used in some instances. A cold start operation in connection with the fuel cell stack is generally required when temperature is below 5° C.

The overall heating of the fuel cell stack while in a cold start mode may take a considerable amount of time. This condition may not enable a driver to simply driveaway after cold starting the fuel cell stack in the vehicle. Some approaches have attempted to short the fuel cell stack in order to heat the fuel cell stack and to reconnect the fuel cell stack (e.g., remove the short condition) to a vehicle bus for normal fuel cell stack operation after the fuel cell stack is heated to a desired temperature. This solution may be inexpensive to implement. However, since the fuel cell stack is shorted while in the cold start mode, vehicle driveaway is not possible. To remove the short state condition, the fuel cell stack must reach the desired temperature. Once the fuel cell stack reaches the desired temperature, the vehicle can then perform the driveaway condition.

Embodiments disclosed herein may provide a fuel cell boost converter to assist with fuel cell stack heating while in the cold start mode. The boost converter allows the fuel cell stack to change output voltage at its desired level while maintaining the optimal voltage on the vehicle side. The heat is generated on the fuel cell stack by exploiting the increase in internal resistance of the fuel cell stack (increasing rate of waste heat production) which occurs when the stack current is increased. For normal fuel cell stack operation, a contactor which forms a portion of the boost converter is closed, thereby bypassing additional electronics within the boost converter which are used to heat the fuel cell stack in the cold start mode. To heat the fuel cell stack in the cold start mode, the contactor is controlled to open, while the additional electronics on the boost converter (e.g., insulated-gate bipolar transistor (IGBT)) is switched to draw current thereby generating heat for the fuel cell stack. This condition provides the driver with the ability to driveaway while the boost converter draws current to heat the fuel cell stack. These aspect and others will be described in more detail below.

FIG. 1 depicts a first apparatus 10 for heating a fuel cell stack 12 in accordance to one embodiment. The first apparatus 10 includes a boost converter 14 that is operably coupled to a plurality of loads 16. The first apparatus 10 may be implemented in a vehicle 13. The boost converter 14 includes a contactor 18, an inductor 20, a diode 22, and a power switch 24 such as an IBGT or other suitable device. During a normal fuel cell startup condition (e.g., vehicle 13 is being started while exterior temperature to the vehicle 13 is greater than 5° C.), the contactor 18 closes such that the fuel cell stack 12 provides electrical power to the loads 16. When the contactor 18 is closed, the electrical current generated from the fuel cell stack 12 flows through the contactor 18 and around the inductor 20, diode 22, and the power switch 24.

In a cold start mode (e.g., the vehicle 13 is being started while exterior temperature is less than 5° C.), the contactor 18 is open and the fuel cell stack 12 powers the inductor 20, the diode 22, and the power switch 24 (hereafter "IGBT 24"). In this case, the IGBT 24 generates heat in response to the power from the fuel cell stack 12. A tube (not shown) carrying coolant is positioned about the IGBT 24 such that the coolant is heated therefrom. The tube extends about the fuel cell stack 12 where the heated coolant is used to heat the fuel cell stack 12. In addition, the IGBT 24 powers the loads 16. It is recognized that the loads 16 comprise any number of vehicle related devices which enable the vehicle to drive and/or operate. In the cold start mode, the IGBT 24 may provide enough power to power at least portions of the load 16 to enable a driveaway condition during fuel cell stack 12 cold start. This will be discussed in more detail below.

FIG. 2 depicts a second apparatus 30 for heating the fuel cell stack 12 in a high voltage implementation in accordance to one embodiment. The second apparatus 30 generally includes the fuel cell stack 12, the boost converter 14, a controller 32 and a temperature sensor 33. In general, the controller 32 may control the contactor 18 to open or close based on the particular mode of the fuel cell stack 12. For example, in the event the fuel cell stack 12 is in a normal fuel cell startup condition, then the controller 32 may control the contactor 18 to close thereby allowing electrical power to bypass the IGBT 24 and additional circuitry within the boost converter 14. In this case, various loads 16 such as but not limited to, a traction motor 34, an air compressor (or cathode compressor) 36, variable voltage loads 38 (e.g., an electrical compressor motor or other suitable device that can operate at a voltage that varies from 170 to 450V), a DC/DC converter 40, fixed-voltage loads 42 (e.g., open-loop controlled induction motor), and a battery 44 are powered from the fuel cell stack 12. The controller 32 is configured to receive a signal from the temperature sensor 33 which is indicative of an exterior temperature of the vehicle 13 during vehicle startup. The controller 32 determines that the vehicle 13 is in the normal fuel cell startup condition if the measured temperature exceeds a predetermined temperature level. In this case, the controller 32 then closes the contactor 18 to allow the fuel cell stack 12 to provide power to the loads 16.

In general, the second apparatus 30 may be generally defined as a high voltage fuel cell stack implementation. In this case, the fuel cell stack 12 provides enough electrical current to power the traction motor 34 and the air compressor 36. For example, the fuel cell stack 12 may provide electrical current that provides between 170 and 450V on a vehicle bus 35 for driving the traction motor 34, the air compressor 36, and the variable voltage loads 38.

The traction motor 34 is configured to enable the vehicle 13 to be driven. The air compressor 36 pressurizes an air stream that is delivered to the fuel cell stack 12 to allow the fuel cell stack 12 to generate the electrical current. In one example, the air compressor 36 may need at least 170V to operate for full fuel stack operation. However, the air compressor 36 may still provide enough pressurized air to allow the fuel cell stack 12 to perform driveaway (e.g., partial operation in the cold start mode) at a voltage that is less than 170V. This will be discussed in more detail below. As noted above, the fuel cell stack 12 receives air and hydrogen and electrochemically converts the same into the electrical current or power.

In the normal fuel cell startup condition (or normal fuel cell operation), the fuel cell stack 12 may generate electrical power that is stored on the battery 44. In addition, the battery 44 may also power various loads 16 in the vehicle 13. The DC/DC converter 40 is arranged as a boost/buck converter. For example, the DC/DC converter 40 may act as a buck converter and step down the voltage as provided from the fuel cell stack 12 to a voltage that is suitable for storage on the battery 44 and for use by the fixed voltage loads 42. The DC/DC converter 40 when arranged to boost voltage, may step up voltage provided from the battery 44 to power the traction motor 34, the air compressor 36, and the variable voltage loads 38.

In the event the controller 32 determines that the temperature is below the predetermined temperature value (e.g., 5° C.) during vehicle startup based on information received from the temperature sensor 33, then the controller 32 determines that the fuel cell stack 12 is experiencing a cold start (e.g., the vehicle is in the cold start mode).

If the temperature falls below 5° C. and the vehicle 13 is started to operate (e.g., fuel cell stack 12 experiences a cold start), then the controller 32 controls the contactor 18 to open thereby allowing the fuel cell stack 12 to apply power to the inductor 20, the diode 22, and the IGBT 24. The IGBT 24 provides heat in response to generating current which is provided to the fuel cell stack 12 for heating the same. In this case, the IGBT 24 provides enough power (or an adequate voltage level) to activate the DC/DC converter 40. For example, the DC/DC converter 40 may have a minimum operating voltage range of between 125-150V. The boost converter 14 in conjunction with the DC/DC converter 40 provides enough voltage (e.g., at least 125 V) and power to operate the loads 16 (including the traction motor 34 and the air compressor 36) to perform driveway in the cold start mode. The DC/DC converter 40 may also boost the voltage from the battery 44 to power the traction motor 34 and the air compressor 36 to allow a driver the ability to perform a driveway.

It is recognized that the temperature plays a role in the driver's ability to driveway. For example, the colder the temperature, then the longer it takes for the vehicle 13 to perform the driveaway. For example, in the event the temperature is −15° C., then it may take approximately twenty to thirty seconds to perform the driveway operation. In another example, in the event the temperature is −40° C., then it may take approximately 1.5 minutes to perform the driveaway condition. In the cold start mode, the boost converter 14 generally provides enough heat to heat the fuel cell stack 12 and enough voltage to power the devices on the bus 35 in order to enable the driver to driveaway. Once the temperature of the fuel cell stack 12 reaches a predetermined level, then the controller 32 controls the contactor 18 to close thereby deactivating the IGBT 24. At that point, increased levels of voltage are then provided by the fuel cell stack 12 to power the various loads 16 on the vehicle bus 35.

FIG. 3 depicts a third apparatus 50 for heating the fuel cell stack 12 in a low voltage implementation in accordance to one embodiment. In general, the third apparatus 50 may be generally defined as a low voltage fuel cell stack implementation. The third apparatus 50 includes a first DC/DC converter 52 and a second DC/DC converter 54 which takes the place of the DC/DC converter 40 as noted in connection with FIG. 2. In addition, the third apparatus 50 includes additional vehicle bus loads 38' (e.g., loads that require a higher voltage amount from the vehicle bus 35 such as the traction motor 34) and battery bus loads 42' (e.g., loads that require a lower voltage amount when compared to the voltage from the vehicle bus 35) from the battery 44 such as, for example, an air-conditioning compressor motor).

The fuel cell stack 12 is generally configured to provide a lower voltage amount (e.g., 250V) than that of the fuel cell stack 12 as noted in connection with FIG. 2. As such, while the contactor 18 is closed in the normal fuel cell operation mode, the first DC/DC converter 52 acts a boost converter and boosts up the 250V to reach 350V to 400V on the vehicle bus 35. Such a boosted voltage on the vehicle bus 35 powers the traction motor 34 and the air compressor 36 in a normal operating mode. Additionally, the additional vehicle bus loads 38' also utilize a voltage between 350 to 400V. The second DC/DC converter 54 may then act as a buck converter and step down the voltage on the vehicle bus 35 to a voltage that is suitable for storage on the battery 44 and for powering the battery bus loads 42'.

In the cold start mode, the controller 32 controls the contactor 18 to open thereby allowing the fuel cell stack 12 to apply power to the inductor 20, the diode 22, and the IGBT 24. The IGBT 24 provides heat to the fuel cell stack 12 for heating the same. In this case, the IGBT 24 provides enough power (or an adequate voltage level) to activate the first DC/DC converter 52. The first DC/DC converter 52 may have a minimum operating voltage range of between 125-150V. In this case, the IGBT 24 provides electrical current which is adequate to provide the minimum amount of voltage to the first DC/DC converter 52 to enable the same to operate. The first DC/DC converter 52 may then boost the voltage from the fuel cell stack 12 to power the traction motor 34 and the air compressor 36 to allow a driver the ability to perform a driveway. The second DC/DC converter 54 may then operate based on the voltage on the vehicle bus 35. In other words, the second DC/DC converter 54 is powered by the voltage on the vehicle bus 35 which remains constant and the voltage on the bus 35 is provided from the output of the first DC/DC converter 52, while the first DC/DC converter 52 receives a voltage of at least 125V or some other minimum voltage.

Figure 4:
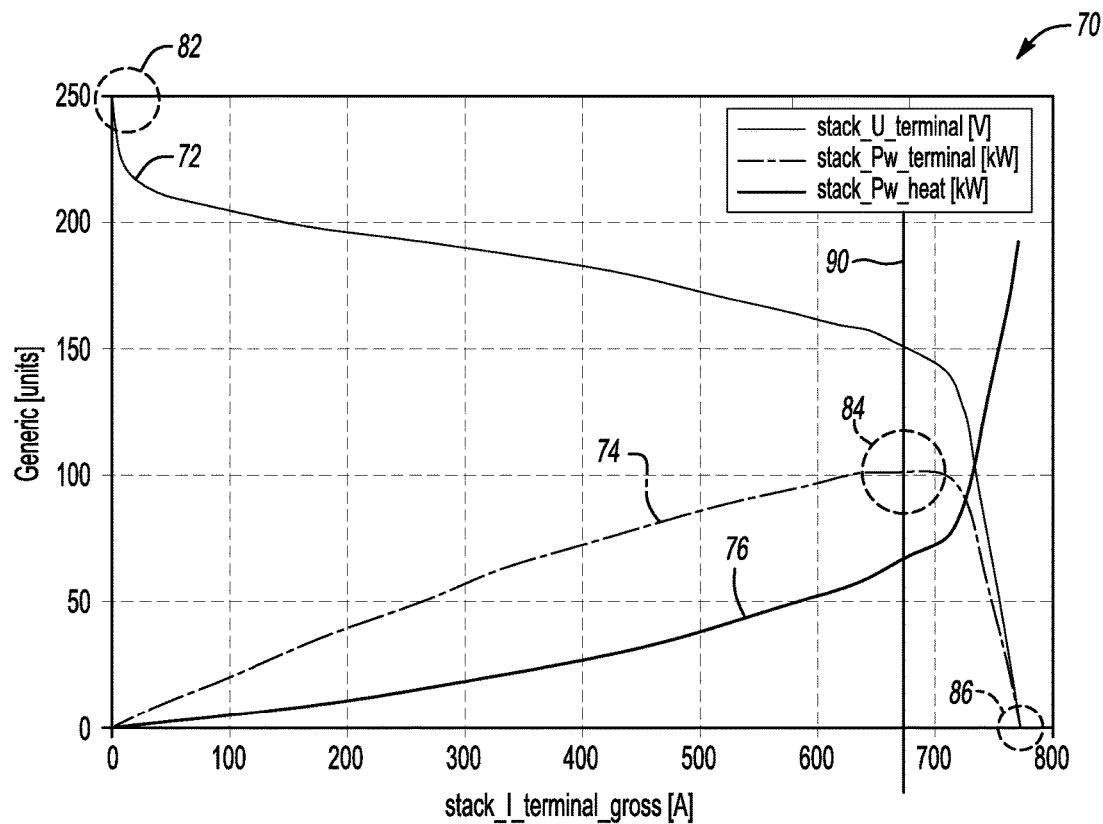
FIG. 4 is a plot depicting various electrical characteristics associated with the fuel cell stack in accordance to one embodiment.

FIG. 4 is a plot 70 depicting various electrical characteristics associated with the fuel cell stack 12 (e.g., in the y-axis) as a function of an output current from the fuel cell stack 12 (e.g., in the x-axis) in accordance to one embodiment. The plot 70 illustrates a first waveform 72 that generally corresponds to voltage at terminals of the fuel cell stack 12. The plot 70 further illustrates a second waveform 74 that generally corresponds to power delivered to the vehicle 13, which is calculated by multiplying the voltage of the fuel cell stack 12 with the output current of the fuel cell stack 12. The plot 70 illustrates a third waveform 76 that generally corresponds to an amount of heat that is provided internally within the fuel cell stack 12.

As generally shown at 82, the first waveform 72 illustrates that the fuel cell stack 12 is at an open circuit voltage (OCV) (e.g., 250 V) and the IGBT 24 is at 0% duty cycle. The second waveform 74 illustrates that as the output current is increased, the power delivered to the vehicle 13 increases while the voltage of the first waveform 72 decreases. In this case, the IGBT 24 increases in terms of its duty cycle resulting in an increase in output current which also causes the voltage at the fuel cell stack 12 to decrease. When the IGBT 24 is at 100% duty cycle, the output current is at a maximum (e.g., around 770A), but the voltage at the fuel cell stack 12 has dropped to 0V.

As generally shown at 84, this condition is indicative of the maximum power available from the fuel cell stack 12 (e.g., the maximum power that can be delivered from fuel cell stack 12 to the loads 16, which will increase as the fuel cell stack 12 warms up. In the second waveform 74, the power delivered to the vehicle peaks at around 675A (which corresponds to a certain X duty cycle for the IGBT 24) then the power delivered decreases. As generally shown at 86, the power delivered drops back to zero when the IGBT 24 is at 100% duty cycle. The vertical line 90 on the plot 70 that crosses 675A on the x-axis corresponds to when the IGBT 24 is at X duty cycle and the power delivered to the vehicle 13 is at its peak. By modulating the duty cycle of the IGBT 24 from X to 100% (e.g., operating the fuel cell stack 12 on the right side of vertical line 90), the fuel cell stack 12 will generate more heat as exhibited in waveform 76 than by modulating the duty cycle of IGBT 24 from 0% to X (e.g., operating the fuel cell stack 12 on the left side of the vertical line 90) for the same power delivered to the vehicle 13 as exhibited in the second waveform 74.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for heating a fuel cell stack in a cold start mode, the apparatus comprising:
    a controller coupled to a boost converter including a power switch that is thermally coupled to a fuel cell stack, the controller configured to:
        receive a signal indicative of a temperature during a vehicle startup;
        compare the temperature to a predetermined temperature value; and
        activate the power switch if the temperature is below the predetermined temperature value,
    wherein the power switch provides heat to the fuel cell stack and generates a voltage for powering a power circuit to enable the vehicle to driveaway while the fuel cell stack receives the heat.

2. The apparatus of claim 1 wherein the boost converter further includes a contactor operably coupled to the fuel cell stack.

3. The apparatus of claim 2 wherein the controller is further configured to open the contactor in the event the temperature is below the predetermined temperature value.

4. The apparatus of claim 2 wherein the controller is further configured to close the contactor in the event the temperature is above the predetermined temperature value.

5. The apparatus of claim 4 wherein the contactor is configured to deliver power from the fuel cell stack to a load in the vehicle to drive the vehicle.

6. The apparatus of claim 1 wherein the power circuit includes a DC/DC converter that receives the voltage to power a cathode compressor and a traction motor to enable the vehicle to driveaway while the fuel cell stack receives the heat.

7. The apparatus of claim 6 wherein the voltage is between 125 and 150V.

8. An apparatus comprising:
    a controller for being operably coupled to a boost converter including a power switch, the controller configured to:
        receive a signal indicative of a temperature during vehicle startup; and
        activate the power switch if the temperature is below a predetermined temperature value,
    wherein the power switch heats a fuel cell stack and generates a voltage for powering a power circuit to enable vehicle driveaway in response to heating the fuel cell stack.

9. The apparatus of claim 8 wherein the boost converter further includes a contactor operably coupled to the fuel cell stack.

10. The apparatus of claim 9 wherein the controller is further configured to close the contactor in the event the temperature is above the predetermined temperature value.

11. The apparatus of claim 10 wherein the contactor is configured to deliver power from the fuel cell stack to a load in the vehicle to drive the vehicle.

12. The apparatus of claim 8 wherein the power circuit includes a DC/DC converter that receives the voltage to power a cathode compressor and a traction motor to enable the vehicle to driveaway while the fuel cell stack receives the heat.

13. The apparatus of claim 12 wherein the voltage is between 125 and 150V.

14. The apparatus of claim 1 wherein the power switch transfers heat therefrom to the fuel cell stack.

15. The apparatus of claim 8 wherein the power switch transfers heat therefrom to the fuel cell stack.

* * * * *